UNITED STATES PATENT OFFICE.

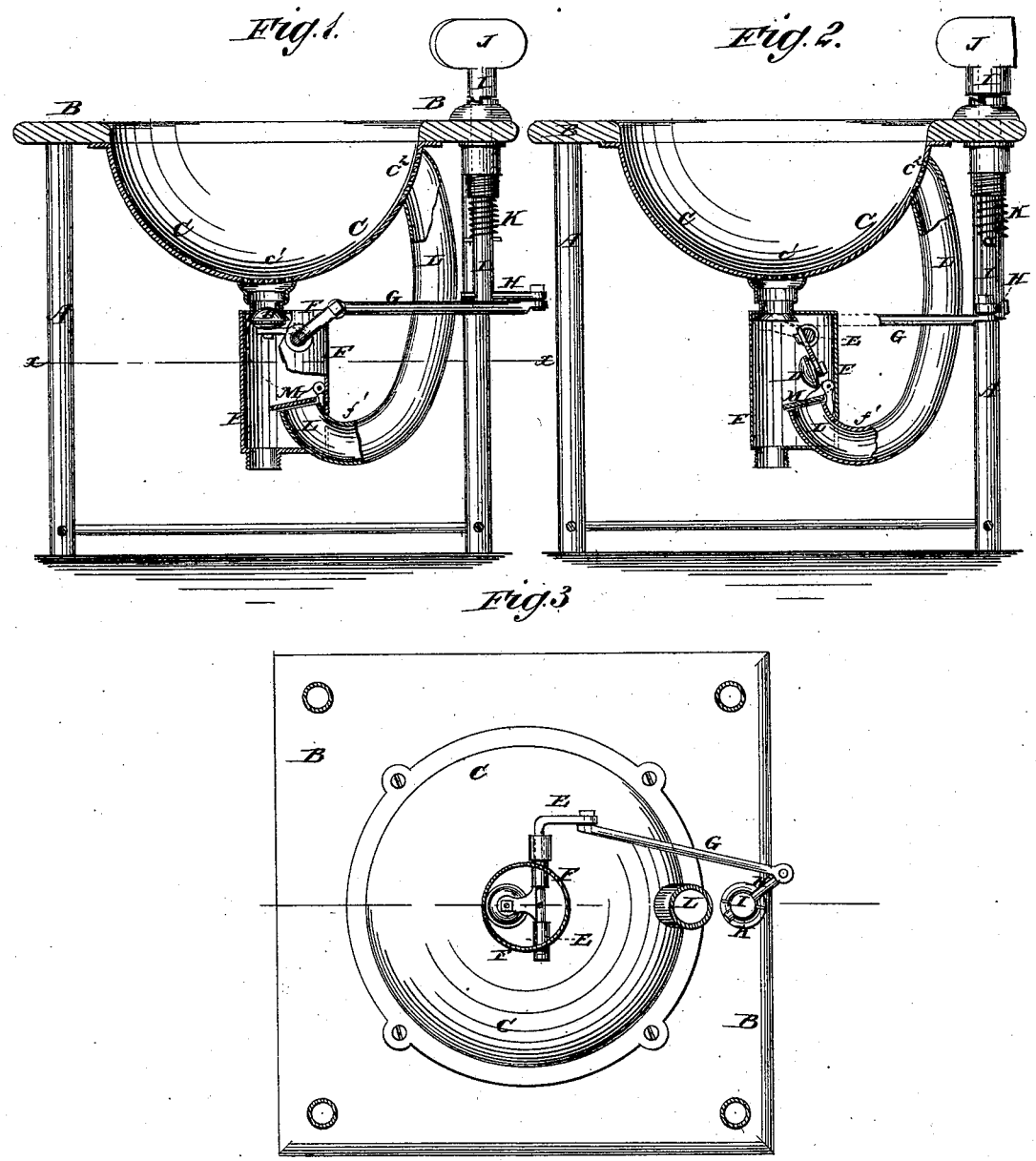

JOHN Q. ADAMS, OF BROOKLYN, NEW YORK.

IMPROVEMENT IN WASTE-PIPE VALVES.

Specification forming part of Letters Patent No. 206,207, dated July 23, 1878; application filed June 7, 1878.

*To all whom it may concern:*

Be it known that I, JOHN Q. ADAMS, of Brooklyn, in the county of Kings and State of New York, have invented a new and useful Improvement in Waste-Pipe Valves, of which the following is a specification:

Figure 1 is a side view, partly in section, of my improved device, shown as applied to a wash-bowl, the valve being shown closed. Fig. 2 is the same view as Fig. 1, but showing the valve open. Fig. 3 is a bottom view of the same, partly in section, through the line $x\ x$, Fig. 1.

Similar letters of reference indicate corresponding parts.

The object of this invention is to furnish an improved means for preventing sewer-gas from passing into the room through the waste-pipes of wash-basins, bath-tubs, privy-basins, &c., which shall be simple in construction and effective in use.

I will describe my invention as applied to a wash-basin, but do not wish to confine myself to that application, as it may be applied with equal facility and advantage to bath-tubs, privy-basins, &c.

A represents the frame or casing, and B the top, of a wash-basin stand. C is a wash-basin, which is secured to the top B in the usual way. In the bottom of the basin C is formed a discharge-opening, $c^1$, and in its side, near its top, is formed an overflow-opening, $c^2$, in the usual way.

The discharge-opening $c^1$ is closed upon the lower side of the bottom of the basin C by a plug-valve, D, opening downward, and which is rigidly connected with the shaft of a crank, E. The shaft of the crank E works in stuffing-boxes in the sides of the valve-chamber F, attached to the bottom of the basin C, around its discharge-opening $c^1$.

To the end of the crank-arm E is pivoted the end of a connecting-rod, G, the other end of which is pivoted to the outer end of the arm H, rigidly attached to the lower end of the rod I. The rod I passes up through a bearing in the top B, and has a knob or other handle, J, attached to its upper end for convenience in operating it.

Upon the upper part of the rod I is placed a spiral spring, K, one end of which is connected with the said rod I, and its other end is connected with the top B, or with the bearings in which the rod I works. The spring K is so arranged as to turn the rod I in such a direction as to close the valve D, and thus prevent the possibility of the said valve being left open.

L is the overflow-pipe, the upper end of which is secured to the basin C around the overflow-opening $c^2$. The lower part of the overflow-pipe L is curved inward and upward, and enters the lower part of the valve-chamber F. The bend $f'$ of the pipe L is such that the lower part of the said pipe may always be filled with water, to serve as a trap to prevent the sewer-gas from passing up through the said overflow-pipe L. The passage of the sewer-gas through the overflow-pipe L is further prevented by a valve, M, connected with the end of the said pipe L in such a way as to be opened by the pressure of the escaping overflow-water, and to be closed by its own weight when the said pressure stops.

Having thus described my invention, I claim as new and desire to secure by Letters Patent—

1. The combination, with basin C, having outlets $c^1\ c^2$, of the chamber F, having a valve, D, at the lower end of the neck, that connects with basin, and the curved waste-pipe trap L, having valve M, as and for the purpose specified.

2. The combination of the downwardly-opening plug-valve D, the crank E, the connecting-rod G, the arm H, the rod I, and the spring K with the discharge-opening of a basin or tub, substantially as herein shown and described.

JOHN Q. ADAMS.

Witnesses:
JAMES T. GRAHAM,
C. SEDGWICK.